May 29, 1962 G. F. LAMBETH 3,036,713
COMBINATION SEWAGE CLARIFIER THICKENER
Filed April 29, 1959 2 Sheets-Sheet 1

INVENTOR
George F. Lambeth
ATTORNEY

May 29, 1962 G. F. LAMBETH 3,036,713
COMBINATION SEWAGE CLARIFIER THICKENER
Filed April 29, 1959 2 Sheets-Sheet 2
Fig. 3.
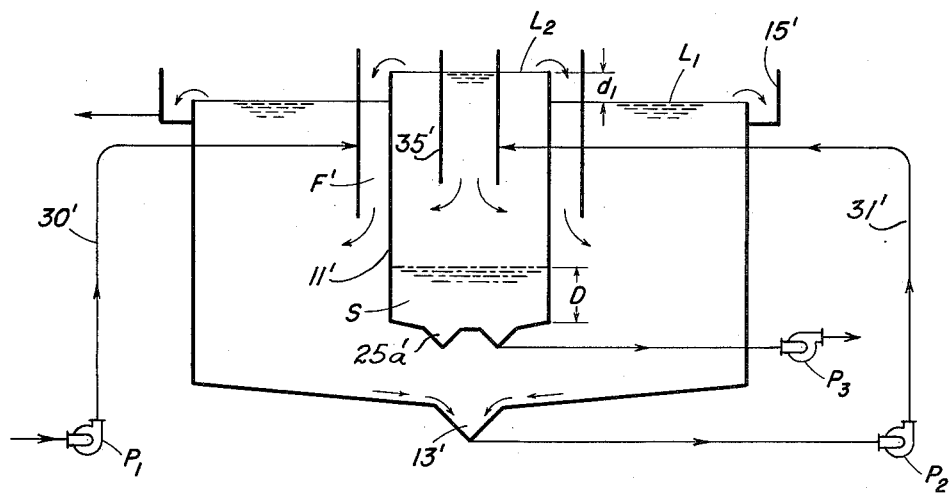
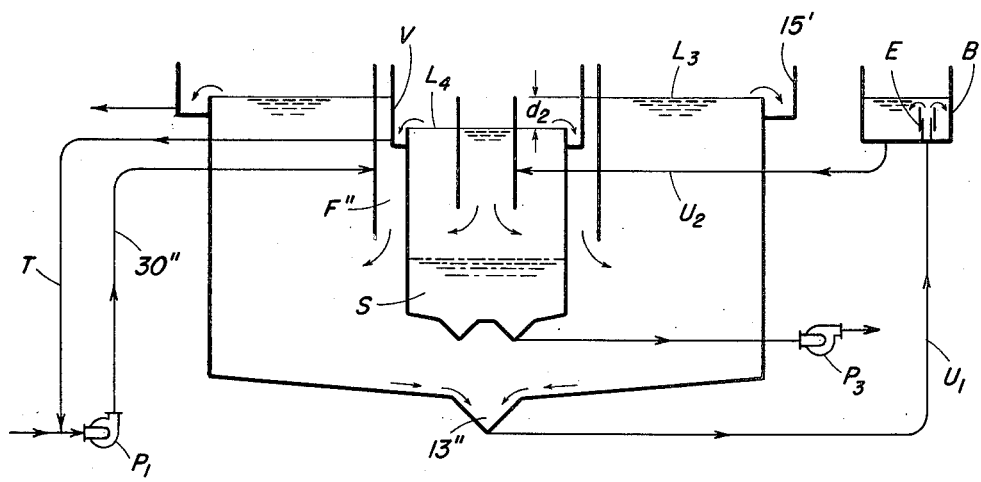
Fig. 4.
INVENTOR
George F. Lambeth
Theodore M. Jablon
ATTORNEY

United States Patent Office 3,036,713
Patented May 29, 1962

3,036,713
COMBINATION SEWAGE CLARIFIER THICKENER
George F. Lambeth, Springdale, Conn., assignor to Dorr-Oliver Incorporated, Stamford, Conn., a corporation of Delaware
Filed Apr. 29, 1959, Ser. No. 809,731
12 Claims. (Cl. 210—197)

This invention relates to continuously operating sedimentation tanks, and more particularly to a tank arrangement for the treatment of suspensions which require clarification in a clarification tank followed by thickening of the sediment or sludge derived from the clarification tank.

Preferably, this invention is concerned with the treatment of raw sewage where it is desired that a dilute raw sewage sludge derived from a primary clarification tank be subjected to a thickening operation in a separate thickening tank. This is for the purpose of separately conducting the clarification operation and the thickening operation, in such a manner as to obtain a high quality primary effluent freed as far as possible of suspended matter so as to benefit the secondary or aerobic treatment of this effluent, and also to obtain a sludge of exceptionally high concentration for the benefit of the subsequent digestion treatment of the sludge.

The invention is therefore preferably concerned with a sewage treatment of the kind disclosed in the Torpey Patent No. 2,850,449, wherein a primary effluent having a minimum of suspended matter is obtained if the primary sludge is withdrawn from the clarification tank at exceptionally high dilution, namely after relatively shorter detention and thus unaged or fresh so that putrefaction of the sludge solids along with gassing will not occur to deteriorate the effluent. According to this patent, the dilute fresh sludge from the clarifier tank is subjected to a specially controlled thickening operation involving besides other controlled factors a sludge bed of substantial depth so controlled that septicity of the sludge will not occur. With the operating conditions in the clarifier and in the thickener controlled in accordance with the teachings of that patent, only a very small but highly loaded thickening tank is required, occupying an area which may be about one twentieth of that of the clarifier tank.

The invention provides a compact space saving single treatment unit in which both the clarification and the separate thickening operation can be carried efficiently and economically at a minimum cost for installation and construction, and in which furthermore transfer pumping means between the clarifier and the thickener, are eliminated.

According to this invention, a clarifier tank has arranged centrally therein a much smaller thickening tank, the thickening tank occupying only a small central area of the clarifier tank, which is an area relatively ineffective for the purpose of clarification. Raw feed to the clarifier tank may be introduced effectively through annular feedwell means surrounding this thickener tank. Sludge from the clarifier bottom is transferred to the thickening tank for thickening while effluent from the clarifier may be sent to secondary or aerobic treatment. The supernatant liquid passing from the thickening tank is returned to the clarifier tank for re-treatment, while the highly thickened sludge is withdrawn from the thickener to a point outside the clarifier tank and may be sent to an anaerobic digestion station.

According to one feature, the concentric arrangement of the tanks makes it possible to provide a single rotary sludge raking structure with single drive mechanism serving both the clarifier and the thickener. Accordingly, a vertical shaft extends through the thickener bottom in sealed relationship therewith, carrying one set of raking means for the clarifier and another set of raking means for the thickener, with the seal around the shaft interposed between these two sets of raking means.

According to the invention, a simple arrangement may be such that supernatant overflowing from the thickener will gravitate directly into the surrounding feedwell for the clarifier; or the arrangement may be such that the dilute sludge from the clarifier bottom is gravitationally displaced into the thickener.

As a result, significant savings are attainable by this invention by the elimination of pumps and transfer conduits needed, whereas in sewage treatment plants the thickener is located separate from and outside of the clarifier.

Other features and advantages will hereinafter appear.

The novel features which are considered as characteristic for the invention are set forth in particular in the appended claims. The invention itself, however, both as to its construction and its method of operation, together with additional objects and advantages thereof, will be best understood from the following desscription of specific embodiment when read in connection with the accompanying drawings in which:

FIG. 3 is a diagrammatical view corresponding to FIG. 1, illustrating the arrangement of the tank relative to each other in accordance with one embodiment featuring a simple effluent transfer from the thickener to the clarifier;

FIG. 4 is a similar diagrammatical view, illustrating the arrangement of the tank in accordance with another embodimeint featuring a simple transfer of the clarifier sludge to the thickener.

Figure 1:
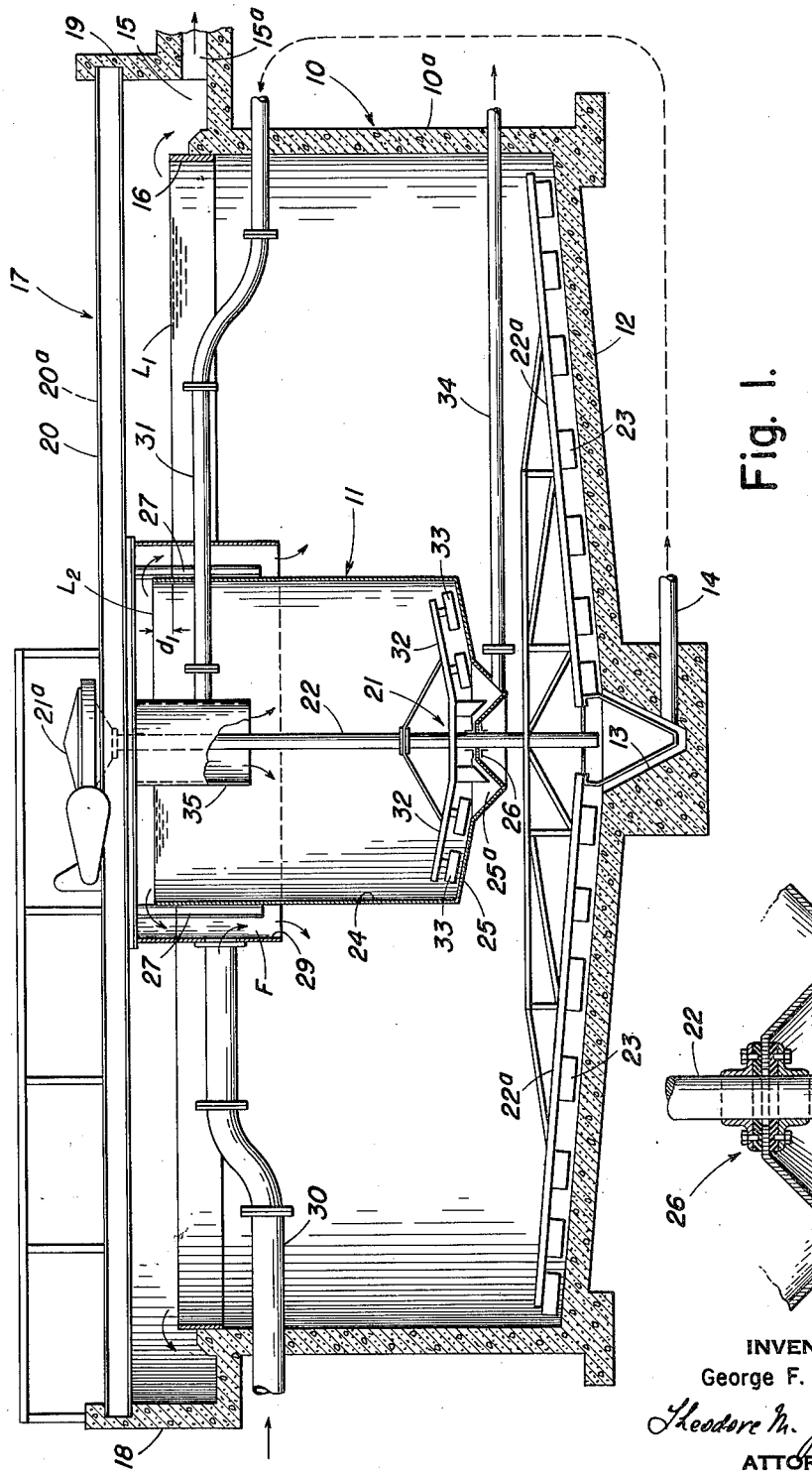
FIG. 1 is a vertical sectional view of the combined clarification and thickening unit of this invention, with the shaft member of the raking structure extending through the bottom of the thickener tank in sealed relationship therewith.

The sedimentation treatment unit in a form exemplary of this invention shown in FIG. 1, comprises a concentric arrangement of a clarifier and a thickener. In this arrangement, a large clarifier tank 10 has placed within it a much smaller thickener tank 11 in such a manner that space is provided between the bottoms of these tanks. Preferably, these tanks are operatively inter-connected to co-operate in a manner described below.

The clarifier tank has a cylindrical fall 10a and a substantially flat bottom 12 of shallow conicity. Centrally at the low point of the bottom below the thickener tank there is a sludge sump 13 to which sediment or sludge from the outer reaches of the bottom may be conveyed for discharge through a sludge withdrawal pipe or conduit 14 leading from this sump. The clarifier tank has a peripherally arranged overflow launder 15 receiving effluent from an overflow weir 16 defining the liquid level $L_1$ in the clarifier tank. The launder has an outlet 15a.

An overhead construction or bridge 17 extending diametrically across the tank is endwise supported as indicated at 18 and 19 respectively. This overhead construction may be in any desired form such as a girder, but is here illustrated as comprising a pair of horizontal parallel structural beams 20 and 20a spaced from each other and preferably arranged symmetrically with respect to the vertical axis of the tank. These beams operatively support a rotary sediment raking structure 21 with drive mechanism 21a therefor. The drive mechanism may be of a familiar type such as exemplified in the patent to Scott No. 2,087,725.

The rotary raking structure 21 thus driven comprises a vertical shaft member 22 supported from the drive mechanism on the bridge, which shaft carries a set of long rake arms 22a provided with familiar inclined raking blades 23 effective to engage the sediment or sludge for conveying the same over the tank bottom towards the central sump for withdrawal.

Figure 2:
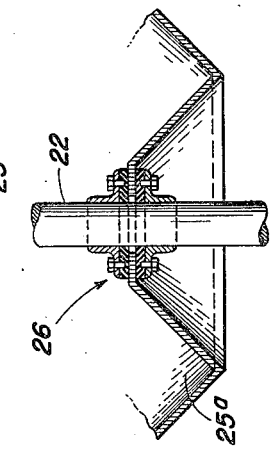
FIG. 2 is an enlarged detail view of the sealing means for the shaft.

According to the invention, the thickener tank 11 is located centrally above the bottom of the clarifier tank so that the long rake arms 22a extend into the space between the bottoms of the tanks. The thickener tank has a cylindrical wall 24 and a bottom 25 which is formed with an annular sump 25a surrounding the vertical shaft member 22. According to the invention, the shaft member extends through the bottom of the thickener tank in sealing relationship therewith as indicated by annular sealing means 26 in FIG. 1 and more clearly shown in the detail of FIG. 2. The thickener tank is supported from the beams 20 and 20a by means of vertical connecting members 27 extending upwardly rigid with the top end portion of the tank and secured to the beams.

These vertical members 27 are arranged in a way such as not to interfere with overflow from the thickener tank which has an overflow level $L_2$ for supernatant liquid, located a distance $d_1$ above the liquid level $L_1$ of the clarifier tank. In this way, supernatant liquid from the thickener may overflow directly into the clarifier tank as will be furthermore described.

According to the invention, the thickener tank 11 is surrounded by feedwell means for introducing feed suspension into the clarifier tank. These feedwell means may be in the form of a cylindrical member 29 also supported from the overhead construction or beams 20 and 20a in concentric relationship with the tanks. The cylindrical member 29 and the thickener tank 11 define between them an annular distributing space or feedwell F into which the feed suspension, for example raw sewage, may be introduced as by means of a feed conduit or pipe 30 leading through the wall of the clarifier tank to a submerged portion of the cylindrical member 29 thus communicating with the feedwell F. Preferably, the feed suspension or sewage is supplied to the clarifier tank through a sewer pump located between the sewer and the tank. It will be noted that the supernatant liquid from the thickener tank will overflow directly into the feedwell F thus joining the feed suspension or sewage entering the clarifier tank. Also in this embodiment, sludge from sump 13 of the clarifier is transferred to the thickener, a sludge feed pipe 31 being shown for that purpose, for thickening. The transfer from pipe 14 to pipe 31 is indicated by a dotted line, but different ways of transfer will be described below.

Preferably, the vertical shaft member carries additional raking means in the form of short rake arms 32 provided with raking blades 33 operating in the thickener and effective to knead the thickened sludge in the bottom strata thereof even while conveying the same to the annular sludge sump 25a for discharge. A sludge withdrawal conduit or pipe 34 carries thickened sludge from sump 25a through the wall of the clarifier tank to a point of disposal outside the tank, the thickened sludge being withdrawn by means of a sludge pump here not shown.

The thickener tank 11 also has a feedwell 35 supplied by the aforementioned sludge feed pipe 31 which extends through the wall of the clarifier tank as well as through a submerged portion of the cylindrical feedwell member 29 and of the wall of the thickener tank. Several forms of carrying out the transfer of clarifier sludge from the bottom of the clarifier tank to the feedwell of the thickener will be described below more fully in connection with the diagrammatic FIGS. 3 and 4.

In the treatment unit shown in the diagrammatic FIG. 3, the tank arrangement corresponds to the one in the example of FIG. 1, like parts being designated by like numbers with the prime sign added thereto. A criterion of this arrangement lies in the fact that the thickener tank 11' has an overflow level $L_2$ for supernatant liquid located a distance $d_1$ above the overflow level $L_1$ of the clarifier tank 10'. The unit is operated in the following manner. A feed suspension, for example, raw sewage supplied from the sewer as by a sewage pump $P_1$ is introduced by feed conduit 30' into the feedwell $F_1'$. In the clarifier the solids settle to the bottom as dilute sludge while clarified sewage liquid known as the primary raw effluent overflows at level $L_1$ into the launder 15' for discharge and if desired for further treatment in an aerobic treatment station. The aerobic flocs created in the aerobic treatment station are then settled out in a secondary or final clarifier tank in the form of a very light flocculent sludge while secondary or final effluent overflows from this clarifier sufficiently treated for release into open bodies of water.

If the operation of the present primary treatment unit is conducted in accordance with the teachings of the aforementioned Torpey patent, the primary sewage sludge is withdrawn or pumped from the sump 13' of the thickener tank by means of sludge pump $P_3$ at an exceptionally high dilution for transfer to the thickener 11'. Accordingly, the operation of the clarifier is conducted in such a manner that the detention of this primary raw sludge is of relatively short duration so that the sludge solids will reach the thickener in a fresh or unaged condition. When operated in this manner the clarifier will attain a maximum of solids containment, that is a maximum of suspended solids being captured in this clarifier, with the result that the so-called primary effluent from this clarifier will be of a high quality insofar as it has a minimum of solids in suspension, which in turn will correspondingly minimize the burden placed upon the secondary or aerobic treatment station.

Pump $P_2$ delivers the dilute primary raw sludge through a transfer conduit or sludge feedpipe 31' to the feedwell 35' of thickener 11'. This thickener will produce a supernatant liquid overflowing directly into the surrounding feedwell $F'$ thus joining the raw feed into the clarifier. Additional transfer piping and a pump such as required in previous tank arrangements between the clarifier and thickener are, therefore, eliminated by the arrangement according to FIGS. 1 and 3 of this invention. This thickening operation if the depth D of a deep sludge bed S and other factors are properly controlled in accordance with the teachings of the above-mentioned Torpey patent, will produce a thickened raw sludge of an exceptionally high concentration. This thickened sludge is withdrawn from sump 25a' of the thickener tank by means of pump $P_3$ and may be transferred for further treatment to anaerobic digestion station. The rate of sludge withdrawal from the thickener may be controlled in such a manner as to maintain the depth of the sludge bed within predetermined limits such as to attain the desired high concentration, yet with a detention time short enough to avoid septicity and gassing in the sludge.

In the unit shown in the diagrammatic FIG. 4 the relationship of the respective overflow levels is the reverse of that shown in FIG. 3, in that the overflow level $L_3$ of the clarifier is located a distance $d_2$ above the overflow level $L_4$ of the thickener. This relationship of the overflow levels is due to the provision of an overflow launder V on the thickener tank so arranged as to receive the supernatant from the thickener at a level below the overflow level of the clarifier. Raw sewage, as in FIG. 3, is supplied through the feed conduit 30'' to the feedwell $F''$ of the clarifier, with clarifier effluent overflow into launder 15', and underflow or primary sludge being gravitationally displaced from the bottom of the clarifier tank to the thickener by the way of conduits $U_1$ and $U_2$ and through an overflow box B. The rate of transfer of sludge from the bottom of the clarifier to the thickener is controllable by vertically adjusting the adjustable intermediate overflow means or overflow sleeve E in an intermediate overflow receiver or overflow box B. Again, no special pump is needed for transferring the supernatant overflowing from the thickener to the clarifier, inasmuch as this arrangement provides for this supernatant to gravitate through a return conduit T to the intake of the sewer pump P₁. Thus, it will be seen that in the arrangement of FIG. 4 only two pumps are needed, namely the sewer pump P₁ and the sudge pump P₃ for the thickened sludge, the transfer pump P₂ of FIG. 3 having been eliminated by the relationship of the overflow levels L₃ and L₄ in conjunction with the operation of the adjustable overflow sleeve E in overflow box B.

As this invention may be embodied in several form without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

In the foregoing description will be seen the underlying concept of placing a thickener tank of small diameter centrally within the clarifier tank and transferring sludge from the bottom of the clarifier tank to the thickener tank for thickening the same, which provides a number of significant advantages especially when applied to sewage treatment as above set forth. Besides compactness and a saving in space as compared with arrangements in which the thickener tank is located separate from and outside of the clarifier tank, the present advantages lie in the saving of pumping equipment and transfer conduits heretofore needed to handle the supernatant from the thickener and the sludge from the clarifier, and in still other savings with respect to the construction of the sludge raking means, which is such that both tanks are served by a single rotary raking structure and a single drive mechanism therefor.

Still other advantages derived from the arrangement according to the invention lie in the return of supernatant liquid from the thickener to the clarifier, a feature which contributes to minimizing any danger of septicity, and further in the manner of non-turbulent introduction of this supernatant liquid into the body of liquid undergoing clarification in the clarifier tank.

I claim:

1. Apparatus for continuous sedimentation treatment of suspensions which require clarification followed by thickening of the sludge derived from clarification, comprising in combination, a clarifier tank having overflow means for effluent and discharge means for removing sludge from the tank bottom; a much smaller thickening tank having overflow means for supernatant liquid; means supporting the thickener tank centrally in said clarifier tank spaced from the bottom thereof; feed means for introducing the suspension into the clarifier tank; rake means mounted for rotation about the central vertical axis of the tanks for conveying the sludge to said outlet means in the clarifier tank when said structure is rotated; means for transferring sludge from the clarifier tank to said thickener tank for thickening; and conduit means for passing thickened sludge to a point outside the clarifier tank.

2. Apparatus for the continuous sedimentation treatment of suspensions which require clarification followed by thickening of the sludge derived from clarification, comprising in combination, a clarifier tank having overflow means for effluent and discharge means for removing sludge from the tank bottom; a much smaller thickener tank having overflow means for supernatant liquid; means for supporting the thickener tank centrally in said clarifier tank spaced from the bottom thereof; feed means for introducing the suspension into the clarifier tank; raking means comprising a centrally disposed vertical shaft member extending through said bottom of the thickening tank in sealed relationship therewith, means for rotatably supporting said shaft member, first sediment engaging means carried by said shaft member extending in the space between the bottoms of said tanks conveying the sludge to said outlet means in the clarifier tank when the shaft member is rotated; second sediment engaging means carried by the shaft member in said thickener tank for impelling thickened sludge to said sludge discharge means; means for transferring sludge from the outlet means of the clarifier tank to said thickener tank for thickening; and conduit means for passing thickened sludge from said thickener tank to a point outside said clarifier tank.

3. Apparatus for the continuous sedimentation treatment of suspensions which requires clarification followed by thickening of the sludge derived from clarification, comprising in combination, a clarifier tank having overflow means for effluent and discharge means for removing sludge from the tank bottom; a much smaller thickener tank having overflow means for supernatant liquid disposed at a level higher than the level of the overflow means of the clarifier tank; means for supporting the thickener tank centrally in said clarifier tank spaced from the bottom thereof; feedwell means surrounding the thickener tank for introducing the suspension into the clarifier tank and adapted to receive overflow directly from said overflow means of the thickener tank; raking means comprising a centrally disposed vertical shaft member extending through said bottom of the thickener tank in sealed relationship therewith, means for rotatably supporting said shaft member, first sediment engaging means carried by said shaft member extending in the space between the bottoms of said tanks conveying the sludge to said outlet means in the clarifier tank when the shaft member is rotated; second sediment engaging means carried by the shaft member in said thickener tank for impelling thickened sludge to said sludge discharge means; means for transferring sludge from the outlet means of the clarifier tank to said thickener tank for thickening; and conduit means for passing thickened sludge from said thickener tank to a point outside said clarifier tank.

4. Apparatus for the continuous sedimentation treatment of suspensions which require clarification followed by thickening of the sludge derived from clarification; comprising in combination, a clarifier tank having overflow means for effluent and discharge means for removing sludge from the tank bottom; a much smaller thickener tank having overflow means for supernatant liquid; means for supporting the thickener tank centrally in said clarifier tank spaced from the clarifier bottom; feed means for introducing the suspension into the clarifier tank; raking means comprising a centrally disposed vertical shaft member extending through said bottom of the thickener tank in sealed relationship therewith; means for rotatably supporting said shaft member; sediment engaging means carried by said shaft member extending in the space between the bottoms of said tanks conveying the sludge to said outlet means in the clarifier tank when the shaft member is rotated; means for transferring sludge from the outlet means of said clarifier tank to said thickener tank for thickening; and conduit means for passing thickened sludge from said thickener tank to a point outside said clarifier tank.

5. Apparatus for the continuous sedimentation treatment of suspensions which require clarification followed by thickening of the sludge derived from clarification, comprising in combination, a clarifier tank having overflow means for effluent and discharge means for removing sludge from the tank bottom; a much smaller thickening tank having overflow means disposed at a level higher than the level of the overflow means of the clarifier tank; means for supporting the thickener tank centrally in said clarifier tank spaced from the bottom thereof; feedwell means surrounding the thickener tank for introducing the suspension into the clarifier tank and adapted to receive overflow directly from said overflow means of the thickening tank; raking means comprising a centrally disposed vertical shaft member extending through said bottom of the thickening tank in sealed relationship therewith; means for rotatably supporting said shaft member; first sediment engagement means carried by said shaft member extending in the space between the bottoms of said tanks conveying the sludge to said outlet means in the clarifier tank when the shaft member is rotated; second sediment engaging means carried by the shaft member in said thickening tank for impelling thickened sludge to said sludge discharge means, transfer conduit means including a pump for transferring sludge from the outlet means of said clarifier tank to said thickener tank for thickening; and conduit means for passing thickened sludge from said thickener tank to a point outside said clarifier tank.

6. Apparatus for the continuous sedimentation treatment of suspensions which require clarification by thickening of the sludge derived from the clarification, comprising in combination, a clarifier tank having overflow means for effluent and discharge means for removing sludge from the tank bottom; a much smaller thickener tank having overflow means disposed at a level lower than the level of the overflow means of the clarifier tank; means for supporting the thickener tank centrally in said clarifier tank spaced from the bottom thereof; feed means for introducing the suspension into the clarifier tank; raking means comprising a centrally disposed vertical shaft member extending through said bottom of the thickening tank in sealed relationship therewith, means for rotatably supporting said shaft member, first sediment engaging means carried by said shaft member extending in the space between the bottoms of said tanks conveying the sludge to said outlet means in the clarifier tank when the shaft member is rotated; second sediment engaging means carried by the shaft member in said thickening tank for impelling the thickened sludge to said sludge discharge means; transfer conduit means between the sludge outlet means of the clarifier tank and the thickener tank so arranged that sludge from said clarifier tank is displaced into said thickener tank; and conduit means for passing thickened sludge from said thickener tank to a point outside said clarifier tank.

7. Apparatus for the continuous sedimentation treatment of suspensions which require clarification followed by thickening of the sludge derived from the clarifier, comprising in combination, a clarifier tank having overflow means for the effluent and discharge means for removing sludge from the tank bottom; a supply pump with conduit means for delivering suspension to said clarifier tank; a much smaller thickening tank having overflow means disposed at a level lower than the level of the overflow means of the clarifier tank; means for supporting the thickener tank centrally in said clarifier tank spaced from the clarifier bottom; raking means comprising a centrally disposed vertical shaft member extending through said bottom of the thickening tank in sealed relationship therewith, means for rotatably supporting said shaft member, first sediment engaging means carried by said shaft member extending in the space between the bottoms of said tanks conveying the sludge to said outlet means in the clarifier tank when the shaft member is rotated; second sediment engaging means carried by the shaft member in said thickening tank for impelling the thickened sludge to said sludge discharge means; transfer conduit means between the sludge outlet means of the clarifier tank and the thickener so arranged that sludge from said clarifier tank is displaced into said thickener tank; return conduit means between said overflow means of the thickener tank and the intake of said supply pump for returning thickener effluent to the clarifier tank together with the feed suspension; and conduit means for passing thickened sludge from said thickener tank to a point outside said clarifier tank.

8. Apparatus for the continuous sedimentation treatment of suspensions which require clarification followed by thickening of the sludge derived from clarification, comprising in combination, a clarifier tank having overflow means for the effluent and discharge means for removing sludge from the tank bottom; a much smaller thickening tank having overflow means for supernatant liquid; means comprising an overhead construction spanning the clarifier tank for supporting the thickener tank centrally in said clarifier tank spaced from clarifier bottom; feedwell means surrounding the thickener tank and supported from said overhead construction for introducing the suspension into the clarifier tank; raking means comprising a centrally disposed vertical shaft member extending through said bottom of the thickening tank in sealed relationship therewith, means for rotatably supporting said shaft member from said overhead construction, first sediment engaging means carried by said shaft member extending in the space between the bottom of said tanks conveying the sludge to said outlet means in the clarifier tank when the shaft member is rotated; second sediment engaging means carried by the shaft member in said thickener tank for impelling thickened sludge to said sludge discharge means; means for transferring sludge from the outlet means of the clarifier tank to said thickener tank for thickening; and conduit means for passing thickened sludge from said thickener tank to a point outside said clarifier tank.

9. Apparatus for continuous sedimentation treatment of suspensions which require clarification followed by thickening of the sludge derived from clarification, comprising in combination, a clarifier tank having overflow means for effluent and discharge means for removing sludge from the tank bottom; a much smaller thickening tank having overflow means for supernatant liquid, disposed centrally in the clarifier tank; feed means for introducing the suspension into the clarifier tank; means for transferring sludge from the clarifier tank bottom to said thickener tank for thickening; and conduit means for passing thickened sludge to a point outside the clarifier tank.

10. Apparatus for continuous sedimentation treatment of suspensions which require clarification followed by thickening of the sludge derived from clarification, comprising in combination, a clarifier tank having overflow means for effluent and discharge means for removing sludge from the tank bottom; a much smaller thickening tank disposed centrally in the clarified tank and having overflow means disposed at a level higher than the level of the overflow means of the clarifier tank; feedwell means surrounding the thickener tank for introducing the suspension into the clarifier tank as well as adapted to receive overflow directly from said overflow means of the thickener tank; feed means for introducing the suspension into the clarifier tank; means for transferring sludge from the clarifier tank bottom to said thickener tank for thickening; and conduit means for passing thickened sludge to a point outside the clarifier tank.

11. Apparatus for the continuous sedimentation treatment of suspensions which require clarification followed by thickening of the sludge derived from clarification, comprising in combination, a clarifier tank having overflow means for effluent and discharge means for removing sludge from the tank bottom; a much smaller thickening tank disposed centrally in the clarifier tank and having overflow means for supernatant liquid disposed at a level lower than the level of the overflow means of the clarifier tank; feed means for introducing the suspension into the clarifier tank; means for transferring sludge from the clarifier tank bottom to said thickener tank for thickening, which sludge transfer means between said tanks are so arranged that sludge from said clarifier tank is displaced into said thickener tank.

12. Apparatus for continuous sedimentation treatment of suspensions which require clarification followed by thickening of the sludge derived from clarification, comprising in combination, a clarifier tank having overflow means for effluent and sludge outlet means at the tank bottom; a much smaller thickening tank having overflow means for supernatant liquid disposed centrally in the clarifier tank at a level lower than the level of the overflow means of the clarifier tank; feed means for introducing the suspension into the clarifier tank; feed means for introducing the suspension into the clarifier tank; means for transferring sludge from the clarifier tank bottom to said thickener tank for thickening, which sludge transfer means between said tanks are so arranged that sludge from said clarifier tank is displaced into said thickener tank, said sludge transfer means comprising an intermediate overflow receiver located substantially at the level of the clarifier overflow, a first transfer conduit connecting the clarifier bottom with said overflow receiver and having a terminal discharge portion therein and adjustable intermediate overflow means associated therewith for discharging transfer sludge into said overflow receiver, and a second transfer conduit connecting said overflow receiver with said thickener tank, said intermediate overflow means being adjustable for controlling the rate of sludge transfer from the clarifier to the thickener tank.

References Cited in the file of this patent

UNITED STATES PATENTS

| | | |
|---|---|---|
| 2,141,133 | Gibbs | Dec. 20, 1938 |
| 2,143,750 | Darby et al. | Jan. 10, 1939 |
| 2,796,175 | Cover | June 18, 1957 |
| 2,889,929 | Kivell | June 9, 1959 |

FOREIGN PATENTS

| | | |
|---|---|---|
| 523,876 | Great Britain | July 24, 1940 |